(12) United States Patent
Brendle et al.

(10) Patent No.: US 9,476,555 B2
(45) Date of Patent: Oct. 25, 2016

(54) HEADLIGHT FOR A MOTOR VEHICLE HAVING AN INTERCHANGEABLE COMPLEX LIGHT SOURCE

(75) Inventors: Matthias Brendle, Tuebingen (DE); Michael Hamm, Eningen u.A. (DE); Kamislav Fadel, Stuttgart (DE)

(73) Assignee: Automotive Lightning Reutlingen GmbH, Reutlingen (DE)

( * ) Notice: Subject to any disclaimer, the term of this patent is extended or adjusted under 35 U.S.C. 154(b) by 152 days.

(21) Appl. No.: 14/238,549

(22) PCT Filed: Aug. 17, 2012

(86) PCT No.: PCT/EP2012/066121
§ 371 (c)(1),
(2), (4) Date: Apr. 22, 2014

(87) PCT Pub. No.: WO2013/024159
PCT Pub. Date: Feb. 21, 2013

(65) Prior Publication Data
US 2014/0226357 A1     Aug. 14, 2014

(30) Foreign Application Priority Data

Aug. 17, 2011   (DE) ........................ 10 2011 081 062

(51) Int. Cl.
*F21V 7/04*    (2006.01)
*F21S 8/10*    (2006.01)
*B60Q 1/00*    (2006.01)

(52) U.S. Cl.
CPC .............. *F21S 48/115* (2013.01); *B60Q 1/007* (2013.01); *F21S 48/1159* (2013.01); *F21S 48/1195* (2013.01); *F21S 48/1225* (2013.01); *F21S 48/1109* (2013.01); *F21S 48/328* (2013.01)

(58) Field of Classification Search
CPC ......... F21S 48/11; B60Q 1/14; B60Q 1/141; B60Q 14/00
USPC ........................................ 362/545, 547, 549
See application file for complete search history.

(56) References Cited

U.S. PATENT DOCUMENTS 7,712,948 B2   5/2010 Schug et al.
2002/0075693 A1*   6/2002 Rosenhahn .......... B60Q 1/1415
362/513

(Continued)

FOREIGN PATENT DOCUMENTS

DE     39 17 813 A1    6/1990
DE    103 22 627 A1   12/2004

(Continued)

OTHER PUBLICATIONS

Mar. 9, 2012 Examination Report for DE 10 2011 081 062.5.
(Continued)

*Primary Examiner* — Ali Alavi
(74) *Attorney, Agent, or Firm* — Howard & Howard Attorneys PLLC

(57) ABSTRACT

A headlight (10) for a motor vehicle having a housing (14), a semiconductor light source (46), a cooling body (48), an optical system (50) which collects and directs light of the semiconductor source, a securing frame (20) which is mechanically connected to the housing (14) and which holds the semiconductor light source (46) with the cooling body (48) and the optical system (50) in the housing (14), and having an interface between the first part (16) which forms a complex light source (46) and comprises at least the semiconductor light source and the cooling body (48), and a second part (18) which comprises at least the holder (20), wherein the first part (16) is connected to the second part (18) at the interface so that it can be separated without destruction. The first part (16) comprises, in addition to the semiconductor light source (46) and the cooling body (48), at least one optical system (50) which collects and directs a light of the semiconductor light source.

17 Claims, 9 Drawing Sheets

(56) References Cited

U.S. PATENT DOCUMENTS

| | | |
|---|---|---|
| 2010/0244649 A1 | 9/2010 | Inaba |
| 2010/0246201 A1* | 9/2010 | Brendle ............... F21S 48/1104 362/519 |
| 2011/0058384 A1 | 3/2011 | Boroczki et al. |
| 2011/0141742 A1 | 6/2011 | Tanaka et al. |

FOREIGN PATENT DOCUMENTS

| | | |
|---|---|---|
| DE | 10 2004 062 989 A1 | 7/2006 |
| DE | 10 2004 062 990 A1 | 7/2006 |
| DE | 10 2005 035 577 A1 | 2/2007 |
| DE | 20 2006 018 081 U1 | 3/2007 |
| DE | 10 2006 054 019 A1 | 5/2008 |
| DE | 10 2007 043 961 A1 | 3/2009 |
| DE | 10 2007 050 924 B4 | 11/2009 |
| DE | 10 2010 045 435 A1 | 3/2012 |
| EP | 0 524 106 A1 | 1/1993 |
| EP | 2 317 213 A2 | 5/2011 |
| FR | 2 727 190 A1 | 5/1996 |
| FR | 2 889 290 A1 | 2/2007 |
| JP | 2010-80072 A | 4/2010 |

OTHER PUBLICATIONS

Feb. 13, 2013 International Search Report for PCT/EP2012/066121.

* cited by examiner

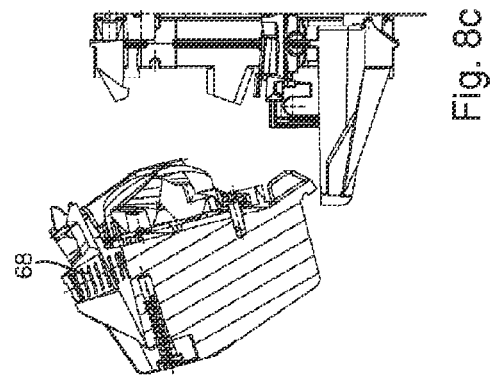
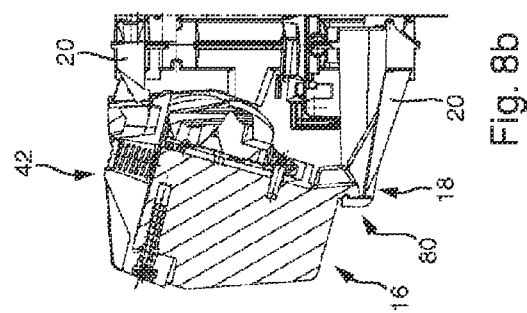
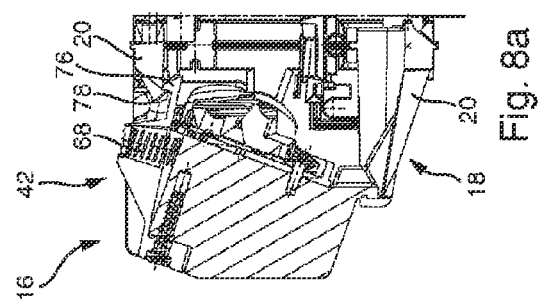

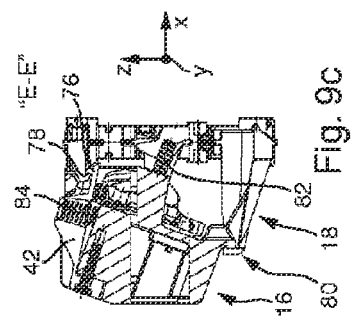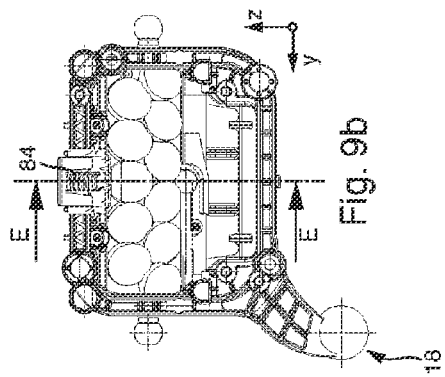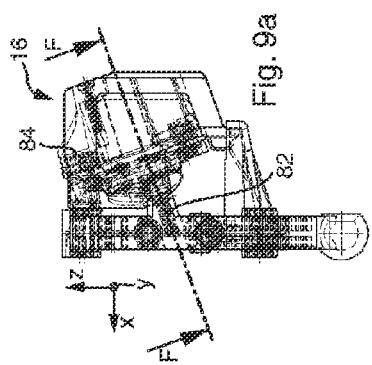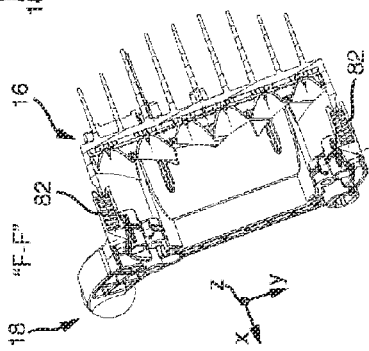

HEADLIGHT FOR A MOTOR VEHICLE HAVING AN INTERCHANGEABLE COMPLEX LIGHT SOURCE

CROSS-REFERENCE TO RELATED APPLICATIONS

This is a "national stage" application of International Patent Application PCT/EP2012/066121 filed on Aug. 17, 2012, which, in turn, is based upon and claims priority to German Patent Application 10 2011 081 062.5 filed on Aug. 17, 2011.

BACKGROUND OF THE INVENTION

1. Field of Invention

The invention relates generally to a headlight for a motor vehicle and, more specifically, to a headlight for a motor vehicle having an interchangeable complex light source.

2. Description of Related Art

The present invention relates to a headlight for a motor vehicle with a housing, at least one semiconductor light source generating light for a main function of the headlight, a cooling body touching the semiconductor light source in thermal coupling, an optical system collecting and directing light of the semiconductor source, a securing frame mechanically connected to the housing which holds the semiconductor light source with the cooling body and the optical system in the housing, and having an interface between a first part forming a complex light source and includes at least the semiconductor light source and the cooling body, and a second part, including at least the holder, wherein the first part is connected to the second part at the interface so that it can be separated without destruction. Such a headlight is known from published U.S. Pat. No. 7,712,948.

In the art of illuminating devices for motor vehicles a distinction is made between "lights" and "headlights." Lights serve the purpose of signaling the presence and/or behavior of a motor vehicle and/or the intentions of its driver to other traffic participants. For example, brake lights, flashing lights, and navigation lights (without this being an exhaustive list).

Headlights serve the purpose of actively lighting the roadway in front of a motor vehicle such that the driver can quickly recognize obstacles in the roadway. The light distributions generated by headlights needs to be compliant with government regulations (for example, to prevent the blinding of other traffic participants). Examples of light distributions generated by headlights include passing light and high beam light distributions (without this being an exhaustive list).

The task or capacity of a component to generate light distributions, be it light distributions or headlight distributions, is also referred to in the art as a light function. With respect to an illuminating device acting mainly as a headlight, headlight functions are also referred to as the "main function: so as to distinguish from other light functions provided by the same illuminating device (for example, when an illuminating device also performs signal light functions).

As known in the art of mass-produced road vehicles, semiconductor light sources have only been used for main headlight functions since around the year 2008, and were introduced earlier for signal light functions. One reason for the delay was the need for higher electric power for main functions in comparison to signal functions.

Because of the relatively lower light fluxes produced by semiconductor light sources used in the automotive industry, several semiconductor light sources are typically combined into complex light sources for main headlight functions, so as to obtain the desired overall high light fluxes. Because of the long service life of light emitting semiconductors, little emphasis has been placed on repair options for headlights with semiconductor light sources until recently. Further, at the beginning of the development of high-performance semiconductor light sources, little data was available about the service life and the probability of failure of the light sources. Initially, it was assumed that the service life of the semiconductor light sources would be more than sufficient for the service life of a motor vehicle. However, there is now great deal more experience available about the durability and the probability of failure of semiconductor light sources used for main headlight functions. There is a desire in the art for interchangeable semiconductor light sources. Particularly in the case of motor vehicles from the mid-range or lower-range price segment, high repair costs for used motor vehicles are undesirable, even where there is a high probability that few motor vehicles are affected by light source failures. Without interchangeable semiconductor light sources, the entire headlight assembly would have to be replaced, which could require a disproportionately high cost compared to the value of the vehicle.

However, difficulties arise in the case of such a replacement. Unlike halogen lamps, semiconductor light sources (such as LEDs) have a thermal interface in addition to the usual electrical and mechanical interfaces (for a power supply and positioning the light source). The thermal interface conducts away the heat generated in the operation of the semiconductor light source. Typically, the LED is firmly thermally coupled to a cooling body with thermal adhesives or heat sink paste. Thus, unlike the mechanical and electrical interfaces, it is difficult to provide the LED with a separable connection.

Further, in the event of a change of the light source there is the danger of the optical system going out of adjustment and causing the oncoming traffic to be blinded. Moreover, light modules for main headlight functions typically require a horizontal and a vertical default setting. Because of this, mounting light modules is expensive and typically prevents disassembly and replacement of the light modules for repair purposes. For this reason, light modules known in the art involve fixed units, where the light module can not be changed without destroying the unit after installation of the headlight during production.

To change LED light sources in the headlight in spite of these obstacles, Published U.S. Pat. No. 7,712,948 provides a light source module that has at least one light emitting element (in particular, LEDs), fiber optics, and collimating elements or lens elements. In addition, a retainer for such a system is provided, in particular in the form of a motor vehicle headlight. The headlight also has an optical system. The light source module is equipped to be positioned on a reference plane of the optical system, wherein it is also equipped to be replaced in a simple way, in particular without requiring soldered or welded connections.

The light source module known in the art has light exit surfaces arranged in series. A longitudinal edge of this arrangement is considered an optical element and should be reproduced by a further optical element (referred to as secondary as a light/dark border of a light distribution of the headlight. To this end, an exact and stable positioning of the longitudinal edge is necessary with respect to the further optical element. First, second, and third reference points are provided for this exact positioning between optical faces of the module and the optical system of the headlight. For example, the reference points should be made of hard rubber, plastic or metal. Position correction should be made possible by altering the thickness of the reference points. A change in the position of the LEDs with their cooling body relative to the remaining light module is also mentioned as an alternate setting option.

SUMMARY OF THE INVENTION

The present invention differs from the prior art with a first part forming the complex light source having at least one optical system collecting and directing a light of the semiconductor light source in addition to the semiconductor light source and the cooling body. In this way, the interface lying between the light exit surfaces of the semiconductor light source known in the art is shifted between the first interchangeable first part and the second part remaining in the headlight. Thus, the shifted interface no longer lies between the light exit surfaces of the semiconductor light sources and the optical system.

Between the light exit surfaces of the semiconductor sources and the entry into the subsequent optical system in the roadway, occurring inaccuracies in position have a strong effect on the quality of the resulting light distribution. This holds true in particular for projection systems whose primary optical systems are used with short focal distance and narrow tolerances in order to produce an intermediate image of the light entry surface of the semiconductor light sources, which is then projected by a subsequent projection lens in the roadway as light distribution into the front region of the headlight.

Due to the inventive shifting of the interface, an advantage is achieved in that no inaccuracies in position occur in the interface between the light exit surfaces of the semiconductor light source and the optical system when the light source is changed. The interface is a part of the pre-installed complex light source as a whole. Thus, inaccuracies in position occurring in the interface do not have as strong an effect on the quality of the light distribution created by the headlight.

Ultimately, using the present invention, a headlight equipped with semiconductor light sources for main functions is provided, in which the light source can be easily changed in case of repair. In particular, the headlight is not incorrectly adjusted when changing the light source. Neither the location of the light module in the headlight nor the optical system of the light module itself is changed in the replacement of the light source.

In one embodiment, the headlight has a housing with a service opening which is open from the factory, or is equipped to be cut open in a predetermined service opening region in case of repair. In operation, the headlight housing has geometries for fastening a cover with which the service opening in the headlight can be closed again after replacement of the complex light source.

In one embodiment, the first part and the second part together form a light module which is a projection module. Further, the light module has a cover equipped for amplification of a brightness gradient at a light/dark border of the light distribution. In another embodiment, the cover is a mirror cover equipped to direct incident light of the semiconductor light sources on a secondary optical system of the projection module.

In one embodiment, the optical system of the complex light source includes all optical components of the light module. Further, the light module is a projection module and the optical system of the complex light source includes a cover as well as a secondary optical system. In a further embodiment, the secondary optical system is a projection lens or a parabolic mirror.

In another embodiment, the individual parts of the complex light source are detachably connected to one another. Further, the complex light source has an electronic component in which parameters of the electrical interface are stored, wherein the parameters can be read via a control device. Further still, the complex light source is equipped with a temperature sensor (in particular, an NTC or PTC resistor) with which the temperature of the light source can be determined.

In one embodiment, the complex light source can be mechanically connected to the light module with detachable fastening elements (for example, screws, latches, bolt or bayonet locks) such that the complex light source can be separated from the light module and replaced without destruction. The latches, bolt, or bayonet locks have at least one spring that presses a bolt or another latching geometry into a counterpiece, in which a bolt element is held (either non-positively or positively). Further, the spring and the bolt element may be designed to be in one piece. The bolt element may be part of the complex light source. Further still, the bolt element may be part of the second part. In another embodiment, several spring elements are equipped to clamp the first part and the second part to one another without play.

Additional features and advantages arise from the dependent claims, the description and the attached figures.

The foregoing features and features still to be explained can be used not only in the respective specified combination, but rather also in other combinations or by themselves without departing from the scope of the present invention.

BRIEF DESCRIPTION OF THE DRAWINGS

Exemplary embodiments of the invention are presented in the figures and are described in greater detail in the subsequent description. The figures show the following, in each case in schematic form:

FIG. 8 shows sectional views of a complex light source together with an interface to the second part of the light module; and FIG. 9 shows reference geometries and springs at the complex light source and a securing frame.

DETAILED DESCRIPTION OF THE INVENTION

Figure 1:
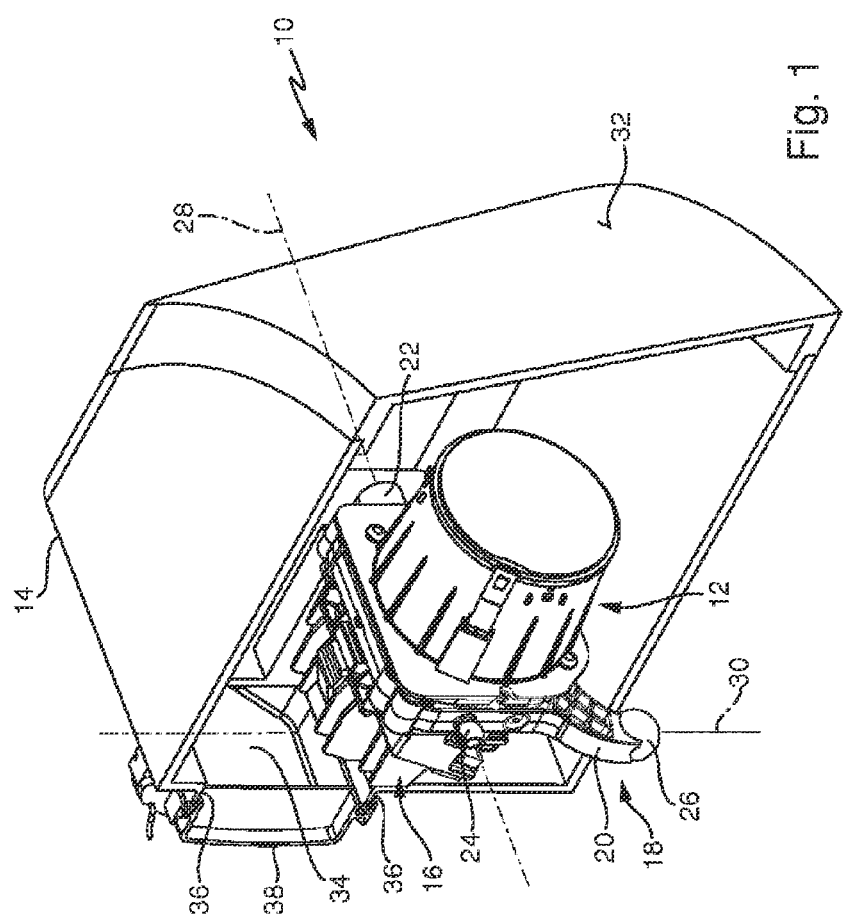
FIG. 1 shows an exemplary embodiment of an inventive headlight with a light module.

FIG. 1 shows one embodiment of an inventive headlight 10 with a light module 12 in a housing 14. The light module 12 has an interchangeable first part 16 and a second part 18 remaining stationary with respect to the headlight 10 in the housing 14 in the event of a replacement of the first part 16. The first part 16 is a complex light source which includes at least the semiconductor light source and the cooling body, as well as at least one optical system collecting and directing light of the semiconductor light source. The second part 18 includes at least one securing frame mechanically connected to the housing 14, wherein the securing frame holds the semiconductor light source with the cooling body and the optical system in the housing 14. The securing frame is connected to the housing 14 of the headlight 10 with at least three hold points. In one embodiment, the connection occurs via hinges 22, 24, 26 with bearings on the securing frame side, such that the light module 12 can be swiveled in the headlight 10 around a horizontal axis 28 and a vertical axis 30.

The housing has a transparent cover disk 32, which covers a light exit opening of the housing 14. In addition, the housing 14 has a service opening 34 or a service opening region. From its size and location, the service opening 34 is equipped to allow insertion and removal of the first part of a light module 12. Through the service opening 34, which may be arranged in a housing rear wall opposite the transparent cover disk, the complex light source 16 can be replaced as the first part 16 of the light module 12, while the second part 18 of the light module 12 remains with the securing frame 20 in the headlight 10.

This service opening 34 for replacement of the light source can be open from the factory, or can be cut into the headlight housing 14 in the case of repair. In the latter case, the housing 14 has the service opening region in place of the service opening 34. In any case the headlight housing 14 has geometries for the fastening of a cover 38, with which the service opening 34 can be locked in the headlight 10 after replacement of the light source. Possible fastening elements include screw bosses, hooks, and/or a stop collar, with or to which a screw cap can be fastened as a cover 38. In such a case, the screw cap is additionally mounted on the headlight housing 14 after the repair.

Figure 2:
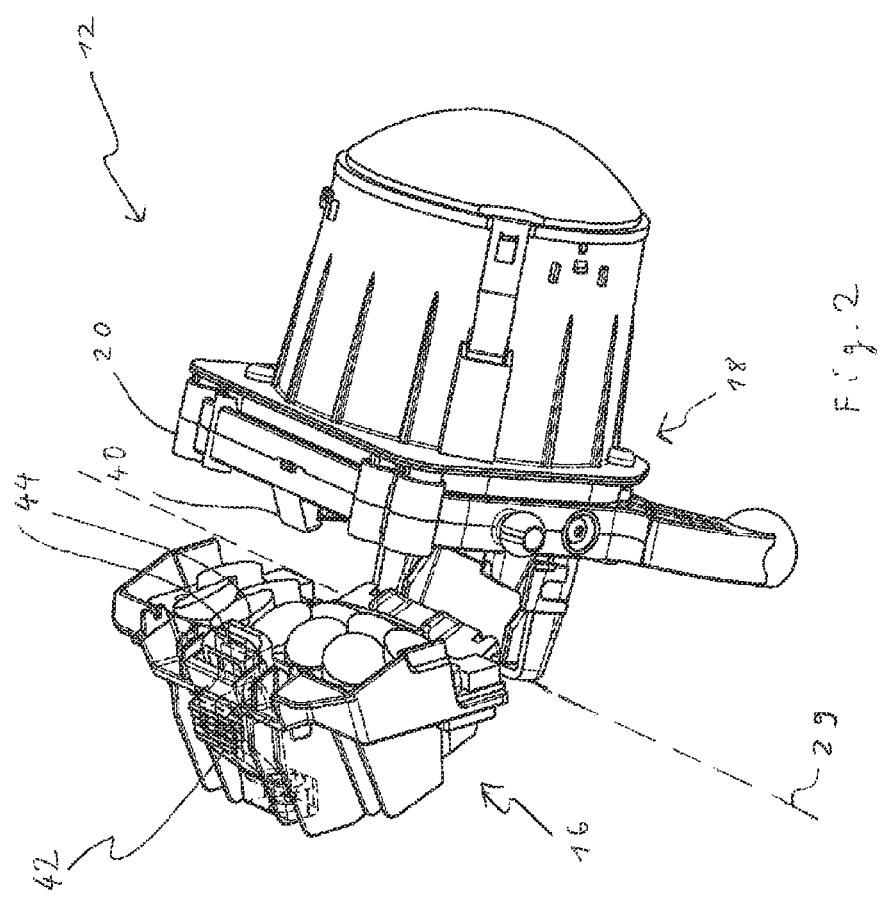
FIG. 2 shows the light module from FIG. 1 with a first part detached from the second part of the light module, but not completely withdrawn from the first part.

FIG. 2 shows the light module 12 from FIG. 1 with a first part 16 detached from the second part 18 of the light module 12, but not completely withdrawn from the first part (the complex light source 16). With the help of positioning or reference geometries and bolt elements complementary to one another on the securing frame 20 and the complex light source 16, the first part 16 can be detachably and precisely fastened on the second part 18 of the light module 12. In operation, reference geometry is defined, for example, as mechanical stops and guides and rigid snap-in elements. By way of example, a spring-loaded movable snap-in element could be the bolt element.

In one embodiment, the first part 16 of the light module has at least two first bearing structures. In each case, a first bearing structure and a second bearing structure forms a pair. The first and second bearing structures are designed such that the bearing structures of a pair engage. Thus, it is possible for the first part to be mounted (or, removed) when it is being connected (or, removed). The first bearing structures are arranged along a straight line which forms a pivot axis 29. This makes it possible for the mounted part to be pivoted around the pivot axis 29. The pivot axis 29 may be parallel to the pivot axis 28. In one embodiment, the first bearing structures are formed by a ribbed profile of the second part perpendicular to the optical axis of the light module. The first part of the light module has open recesses on one side. As an example of a recess open on one side, reference is made to a U shape. In the case of mounting (or, removing), the first part in (or, from) the second part, the opening permits a mounting (or, removal) of the section of the ribbed profile into (or, from) the recess.

The bearing structures may be arranged such that, in the case of an orientation in space, (as arises in the event of a proper use of the headlight in a vehicle on a level road), the mounted first part remains in the mounted state due to gravity and does not fall out. This simplifies the installation because it is not necessary to hold it in place. The first part is mounted in a first step and in a second step it, is locked by a swivel movement. Both procedures can be executed easily.

In one embodiment, the first part additionally has ribbed profiles running parallel to the optical axis of the light module, and the second part has complementary recesses open on one side, which encompass the first ribbed profiles in mounted state with as little play as possible. The pairs of recesses and ribbed profiles permit a swivel movement around the axis 29 and hold in place the position of the first part to the second part in the direction of the pivot axis. Further, the ribbed profiles running parallel to the optical axis and the ribbed profiles that are perpendicular to the optical axis may merge into one another such that T profiles arise, which in addition to their bearing and guide functions, also have structure that reinforces the mechanical strength of the light module. In one embodiment, one swivel bearing structure is present and one guide is present parallel to the optical axis. These embodiments provide a headlight which has bearing structures that permit mounting of the first part into the second part and pivoting of the mounted part taking place around a pivot axis 29 to a locking position.

Overall, the positioning or referencing geometries and complementary bolt elements on the securing frame 20 are equipped to cooperate in the locked position such that the first part is held precisely, firmly and without play. To detach the complex light source 16 forming a first part 16 of the light module 12 from the light module 12, the complex light source 16 is first detached by pressing the spring-loaded bolt element 42. FIG. 2 shows a movable end 44 of the bolt element 42 in two positions, to illustrate the movement options of the movable end 44. Subsequently, the complex light source 16 can be swiveled out from the reference geometry of the securing frame 20, lifted from the second part 18, and removed from the headlight housing through the service opening. In this way, the complex light source 16 is easy to replace and can be replaced like a conventional halogen or xenon lamp in the event of damage. At the same time, the second part 18 of the light module 12 remains stationary in the headlight.

Figure 3:
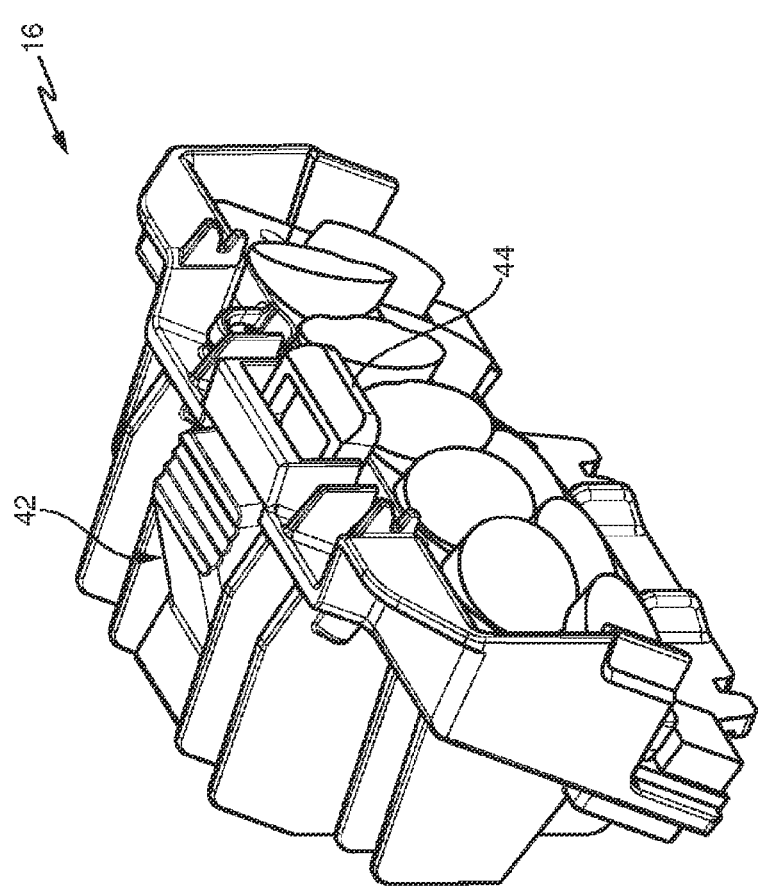
FIG. 3 shows an embodiment of a complex light source forming the first part of the light module from FIG. 2 completely withdrawn from the second part of the light module.
Figure 4:
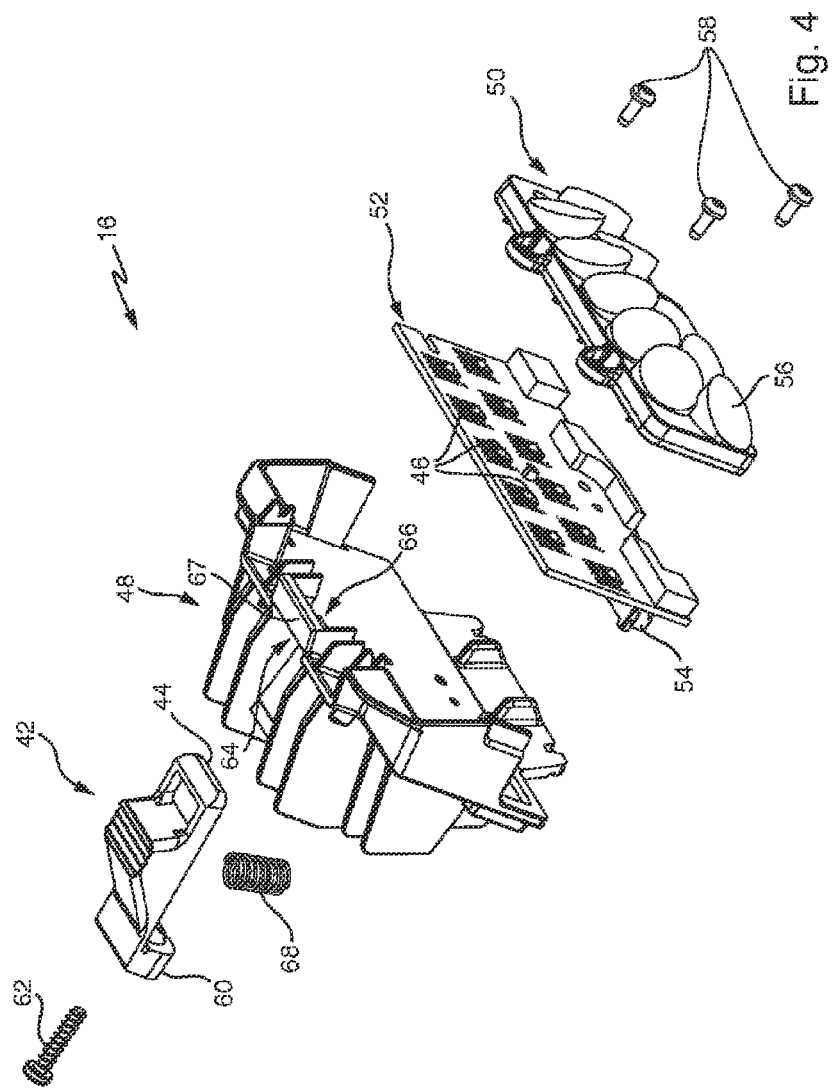
FIG. 4 shows an exploded view of the complex light source of FIG. 3.

FIG. 3 shows one embodiment of a complex light source 16 forming the first part of the light module from FIG. 2 in a completely lifted state from the second part of the light module. FIG. 4 shows an exploded view of the complex light source of FIG. 3. The complex light source includes at least one semiconductor light source, the cooling body, and at least one optical system 50 collecting and directing light of the semiconductor light source(s) 46. In one embodiment, a total of 10 (n=10) semiconductor light sources 46 in the form of LEDs (light emitting diodes) or laser diodes are arranged on a circuit board 52 (or, a bus bar) with the semiconductor light sources controlling the LEDs and supplying them with electrical power. A plug 54 is used to establish a detachable plug connection to the electrical outlet of the circuit board (or, bus bar) to an electrical power supply on-board the motor vehicle. The number n can deviate from 10 and may particularly fall between 3 and 100.

The circuit board 52 is firmly connected to the cooling body 48 in the joined state of the complex light source 16 and makes good thermal contact, in particular a heat conducting contact. The connection takes place in one embodiment with the help of a heat conducting adhesive or a heat sink paste. The cooling body 48 may consist of a good heat conducting metal such as aluminum or copper. The cooling body 48 may also have structures that enlarge its surface, such as cooling ribs or cooling pins. In one embodiment, a single piece and continuous cooling body 48 is used for all of the semiconductor light sources 46. The heat produced by the individual semiconductor light sources 46 is then distributed uniformly in the entire cooling body volume. This effectively prevents local overheating.

In addition, the complex light source 46 forming a first part of the light module 12 has an optical system 50 collecting and directing light of the semiconductor light source(s). In one embodiment, this optical system 50 collecting and directing light includes a single-piece, transparent, and solid body in which auxiliary optical systems are formed for a complex light source 16 having n semiconductor light sources. The auxiliary optical systems direct the light in a predetermined way. In one embodiment, the auxiliary optical systems are near field lenses with short focal distance whose focal points lie in a Petzval surface of a subsequent projection lens in the light path.

In the case of a projection system, the auxiliary optical systems 56 form the light of the semiconductor light sources 46 (for example, such that within the light module 12 a light distribution in the form of an original image of the light distribution to be produced by the light module develops 12 in the front region of the headlight 10). This original image is projected by a subsequent projection lens in the light path in the front region of the headlight 10. In this case, the auxiliary optical systems 56 have short focal distances, making necessary a precise positioning of the auxiliary optical systems 56 with respect to the semiconductor light sources 46.

In one embodiment, the transparent solid body of the optical system 50 is fastened to the cooling body 48 with screws, wherein the circuit board 52 is fixed between the transparent solid body and the cooling body 48. Due to the necessity of a good thermal bond (which, for example, is imparted by a heat sink paste), the interface between the semiconductor light sources 46 and the cooling body 48 is difficult to detach and, therefore, is not suitable as an interface for a light source replacement.

Because of the small focal distances and the narrow tolerances of position at the interface between the semiconductor light sources 46 and their auxiliary optical systems 56, it is likely that in small inaccuracies in position will cause great adverse effects to the quality of the light distribution ultimately to be produced.

One advantage of the present invention is that the interface between the first part 16 of the light module 12 and the second part 18 of the light module 12 does not exactly lie between the semiconductor light sources 46 and the cooling body 48. Further, the interface does not lie between the semiconductor light sources 46 and an optical system 50 collecting and directing light of the semiconductor light source. Because these two critical interfaces are part of the complex light source, the connections corresponding to these critical interfaces do not have to be separated in the event of a replacement of the light source.

As shown in FIGS. 3 and 4, the complex light source 16 has a bolt element. The bolt element 42 has a fixed end 60 that is fastened with a screw 62 to the cooling body 48, and a movable end 44 that is guided elastically/flexibly into a guide 64 of the cooling body 48. The guide 64 has a recess 66 that is open to the circuit board 52, wherein the recess is set up both to guide movement of the movable end 44 of the bolt element 42 and to limit it by a stop 67. A spring 68 is arranged between the cooling body 48 and the bolt element 42, wherein the arrangement takes place such that the spring 68 presses the movable end 44 of the bolt element 42 against the stop 67.

In one embodiment, the individual parts of the complex light source 16 are detachably connected to one another, so that in the case of service individual parts of the complex light source 16 (in disassembled state of the complex light source 16) can be replaced. In another embodiment, the complex light source 16 also has an electronic component in which parameters of the electrical interface are stored and can be read out via a control device. Such parameters are, for example, the values of the operating current to be observed depending on the production batch of the semiconductor light sources 46 and the operating voltage of the semiconductor light sources 46. In the simplest case, the electronic component is an electrical resistor. One parameter value is stored with each such coding resistor. As an alternative to coding resistors, in one embodiment, programmable electronic storage elements are utilized that can be read out via a data bus. In this way, it can be ensured that the semiconductor light sources 46 of the new complex light source 16 (which may require altered operating voltages and/or operating currents) can be operated with correctly adapted values. Another example of an additional component of the complex light source is an NTC (negative temperature coefficient) or PTC (positive temperature coefficient). These are types of resistors that are dependent on temperature, with which the temperature of the light source can be determined.

In one embodiment, the complex light source 16 has electronic devices for controlling the semiconductor light sources for the operation of the semiconductor light sources on the on-board power supply of the motor vehicle. This device supplies the semiconductor light source(s) with a regulated operating current and/or a regulated operating voltage. For their part, the electronic devices may be controlled by a control device that is not a component of the complex light source and which communicates with the electronics of the complex light source via a vehicle bus and connector. In one embodiment, supply of the electronics of the complex light source with electrical power also takes place. The controller can be arranged within or outside of the headlight in the vehicle.

FIGS. 1 through 4 show a headlight 10 for a motor vehicle with a housing 14, at least one semiconductor light source 46 producing light for a main function of the headlight 10, a cooling body 48 contacting the semiconductor light source 46 in thermal coupling, an optical system 50 collecting and directing light of the semiconductor light source(s) 46, a securing frame 20 mechanically connected to the housing 14 which holds the semiconductor light source(s) 46 with the cooling body 48 and the optical system 50 in the housing 14, an interface between a first part forming the a complex light source 16, which includes at least the semiconductor light source(s) 46 and the cooling body 48, and a second part 18, which includes at least the securing frame 20. In operation, the first part 16 is connected to the second part such that it can be separated without destruction, and the first part 16 forming the complex light source 16 has, in addition to the semiconductor light source(s) 46 and the cooling body 48, at least one optical system 50 collecting and directing light of the semiconductor source(s) 46.

Figure 5:
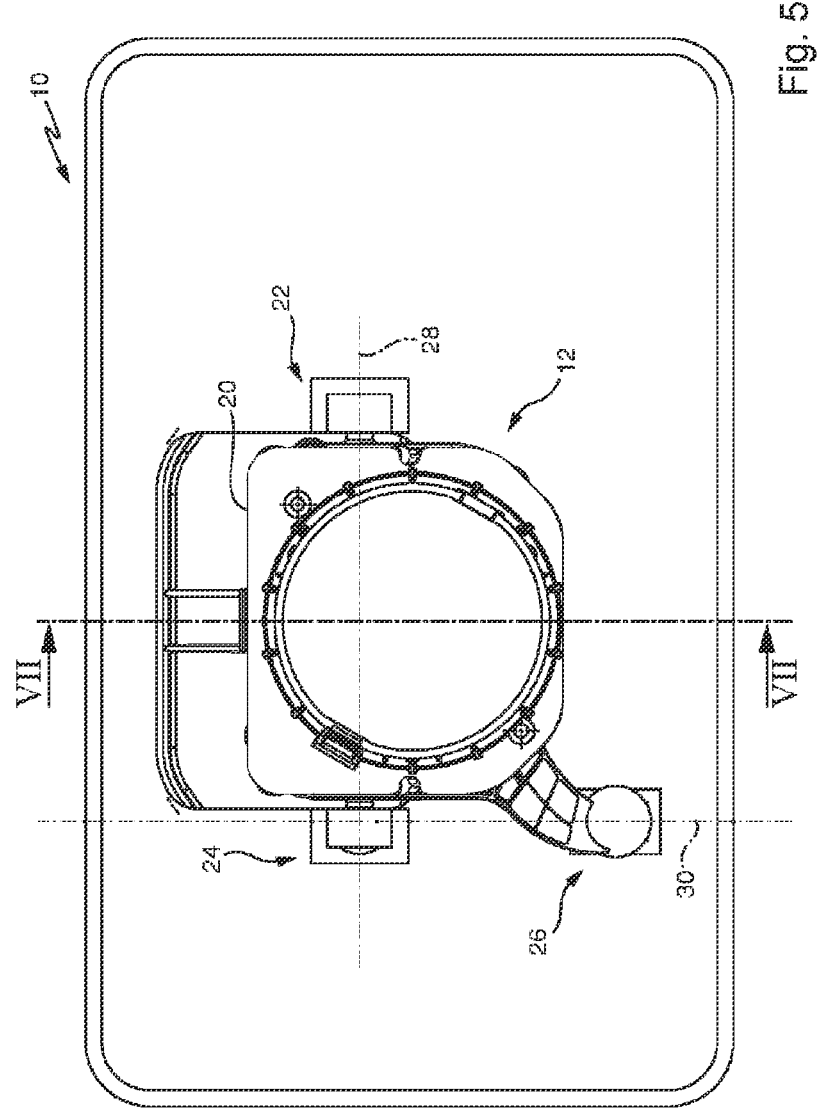
FIG. 5 shows a front view of the headlight with the light module.

FIG. 5 shows a front view of the headlight 10 with the light module 12. Thus, the view is from a direction that is anti-parallel to a main direction of emission of the light module 12. FIG. 5 shows a first axis 28 and a second axis 30, around each of which the light module 12 can be swiveled. The first axis 28 is pivotably mounted in/to a first bearing or hinge 22 and in/to a second bearing or hinge 24. The second axis 30 is pivotably mounted in/to the second bearing or hinge 24 and a third bearing or hinge 26. In one embodiment, the second bearing 24 is a ball joint in which the first axis 28 and the second axis 30 intersect. In an installed state, the first axis is horizontal and thus aligned about parallel to the road surface. The pivotability around the first axis allows a default setting of the beam width and a setting for the vertical position of a horizontal light/dark border and/or an automatic beam width adjustment of the light module 12.

The second axis 30 is arranged at such an angle to the horizontal one that pivotability around the second axis 30 allows a default setting of the main direction of emission of the light module 12 in horizontal direction and/or a bending light function, in which the light module 12 is pivoted, such as in the event of traveling around corners, such that its light beam swivels to the left in the case of a left turn and swivels to the right in the case of a right turn. In the case of an installed headlight 10, the second axis 30 is therefore substantially vertically aligned.

The securing frame 20 of the light module 12 which may be swiveled in operation, corresponds to the second part 18 of the light module 12, with the second part remaining stationary in the housing 14 in the event of a replacement of the complex light source 16 with respect to the headlight 10. Thus, replacement of the complex light source 16 is not associated with a change of the default setting of the light module 12 and does not require a separation of kinematics for beam width adjustment or bending light function.

Figure 6:
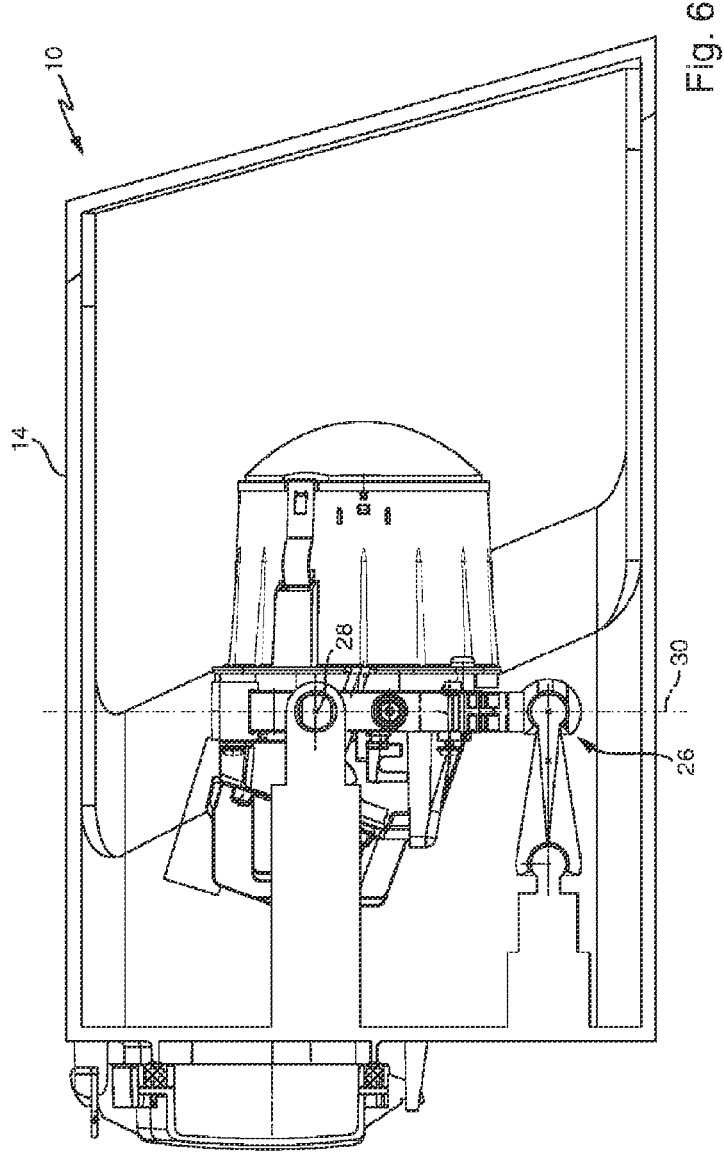
FIG. 6 shows a lateral view of the subject matter of FIG. 5.

FIG. 6 shows a lateral view of the (cut open) headlight 10 from FIG. 5 and, in connection with FIG. 5, shows the support of the first axis 28 and the second axis 30. The pivoting around the second (vertical) axis 30 takes place by having the first bearing 22 (concealed in FIG. 6) swiveled by an actuator around the second axis 30. The pivoting around the first (horizontal) axis 28 takes place by having the third bearing swiveled by an additional actuator around the first axis 28. Thus, the first bearing 22 and the third bearing 26 are movable in the housing 14, while the second bearing 24 forms a stationary hold point with respect to the housing 14. Thus, FIGS. 5 and 6 illustrate how the hold points of the light module 12 in the housing 14 are designed in one embodiment, such that the light module 12 in the headlight 10 can be swiveled around a first horizontal axis 28, and a second vertical axis 30.

Figure 7:
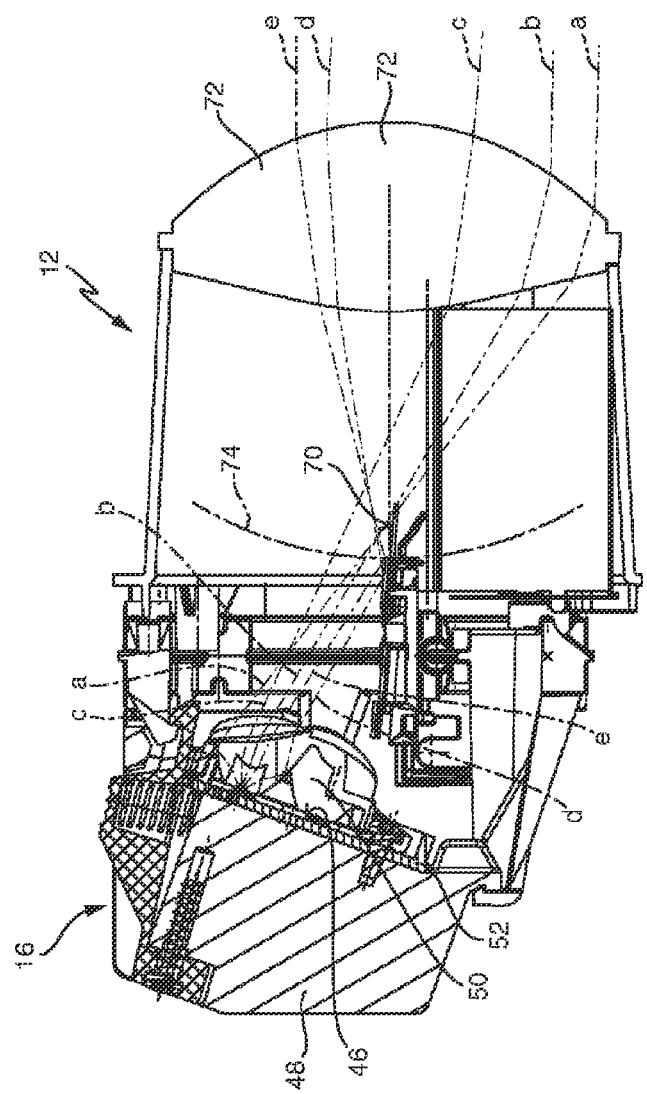
FIG. 7 shows one embodiment of the light module as a projection module in sectional view.

FIG. 7 shows one embodiment of the light module 12 as a projection module, as known in the art, along a line of intersection VII-VII in FIG. 5. The projection module of FIG. 8 has semiconductor light sources 46, a primary optical system as the optical system 50, a mirror cover 70, and a secondary optical system 72. The semiconductor light sources 46 are soldered to a circuit board 52. Together with the primary optical system, this circuit board 52 forms the complex light source 16, which is implemented here as an array of one near field lens for each semiconductor light source 46, the cooling body 48, and the lock. The light emitted by the semiconductor light sources of the complex light source, from which individual beams a, b, c, d, e are shown, is formed by the near field lenses of the primary optical system into a light distribution in a curved surface, which corresponds to the Petzval surface 74 of the projection lens, which forms the secondary optical system 72. The cover plane contacts approximately the Petzval surface of the projection lens. The Petzval surface is a curved surface in the object space of a projection lens, which is reproduced by the projection lens on a plane surface in the image space of the projection lens. In FIG. 7, the object space is on the left and, thus, is in the light path before the projection lens, while the image space is on the right and, thus, is in the light path after the projection lens.

The mirror cover 70 divides the beam path of the primary optical system into a reflected portion (beams d, e) and a portion propagating past without reflection on the cover (beams a, b, c). Both portions are limited by the mirror edge in the cover plane such that a light distribution with a sharp light/dark border is produced. This light distribution is projected through the projection lens onto the street. In operation, the mirror cover also reflects the part of the light (beams d, e) that is first shadowed onto the secondary optical system 72, such that this part is also refracted in the light area of the resulting light distribution and thus is not lost.

In one embodiment, the optical system of the light module 12 includes the complex light source 16 with a primary optical system, which produces a light distribution in an intermediate image surface. A secondary optical system, whose Petzval surface 74 lies roughly in the intermediate image surface, projects the light distribution of the intermediate image onto the street. The secondary optical system includes a projection lens. However, in one embodiment, it may also have at least one paraboloid reflector.

The cover 70 produces distributions of passing light which have a light/dark border (HDG). The cover is arranged with respect to the Petzval surface of the secondary optical system such that the cover shadows or reflects a part of the light of the semiconductor light sources collected and directed by the primary optical system, wherein the shadowed or reflected part of the light does not penetrate through the secondary optical system or, in another beam path, penetrates through the secondary optical system as would be the case without the cover. In this way, the illumination gradient in the HDG can be increased and the range of the headlight can be improved.

As discussed above, the complex light source 16 includes the cooling body 48, the circuit board 52, semiconductor sources 46, and an optical system 50 collecting and directing light of the semiconductor light source(s) 46. In one embodiment, this optical system is restricted to the primary optical system of a projection system. However, in one embodiment, the optical system 50 includes not only the primary optical system, but rather all optical components of the light module 12. In the case of a projection light module, this includes (along with the primary optical system array) at least a cover or a mirror 70, as well as at least one secondary optical system 72 realized as a projection lens or as a parabolic mirror. Further, the second part 18 of the light module 12 remaining in the housing includes the securing frame 20 with mounting and default setting. In one embodiment, a mechanical adjustment option is also provided for the secondary optical system and the cover on the securing frame, wherein the mechanical adjustment option can be adjusted in the direction of the optical axis.

FIG. 8 shows sectional views of the complex light source together with the interface to the second part of the light module in different stages of replacement of the complex light source. FIG. 8 shows one embodiment where the bolt element 42 is a part of the complex light source 16.

However, the bolt element can also be part of the securing frame 20. FIG. 8 shows the bolt element 42 in different positions.

In FIG. 8a, a snap-on hook 76 of the bolt element 42 engages a complementary snap-on edge 78 of the second part 18. In operation, the bolt element 42 is held by the spring 68 in a locked position. The complex light source is in a state where it is snapped into the second part 18 of the light module 12. In operation, the spring 69 is pre-stressed. The complex light source 16 is locked with the second part 18 of the light module. In the locked state, the spring-loaded bolt element 42 presses the complex light source downward onto reference stops of the second part 18 of the light module, and clamps the connection in vertical direction without play. Because the spring 68 has to be tensioned further to release the connection, the locked state represents an energetically stable position that can only be released by supplying energy from the outside.

FIG. 8b shows the spring-loaded bolt element in a downward pressed position for releasing the complex light source, in which the complex light source 16 can be swiveled and removed. In FIG. 8b, the spring 68 is tensioned at its maximum. The snap-on hook 76 of the first part 16 of the module is no longer held behind the snap-on edge of the second part 18 of the light module. The complex light source 16 is unlocked. The first part 18 of the light module can be swiveled from its catch position. In operation, the swivel movement takes place around a rotary joint 80 formed by interlocking protrusions of the first part 16 and of the second part 18.

FIG. 8c shows the complex light source 16 in a completely released state from the second part 18 of the light module. In this state, removal of the complex light source 16 from the housing 14 is possible. The spring 6 is slackened at its maximum.

In one embodiment, the spring 68 and the bolt element 42 are realized as separate components. In another embodiment, they are designed as a one piece continuous component (for example, as a profiled wire spring). FIG. 8 also shows one embodiment where the bolt element is part of the complex light source. In another embodiment, the spring-loaded bolt element is part of the securing frame. Further, the locking geometry can also be rigidly molded onto the complex light source and the second part of the light module, such that the complex light source must execute the locking motion, as a whole, and the spring element presses the complex light source, as a whole, into the snap-on geometry on the retainer. Similar solutions are used, for example in the case of bayonet connections of lamps, wherein the entire lamp has to be shifted and twisted in order to connect the involved components to one another or to release said components from one another.

In one embodiment, the complex light source can be connected with detachable fastening elements (for example, screws, latches, bolt, or bayonet locks) in mechanically detachable manner to the second part of the light module, such that the complex light source can be separated from the light module without destruction and be replaced. Latches, bolt, or bayonet locks may have at least one spring which presses the bolt or another latching geometry into a counterpiece, into which the bolt is held positively. To release the connection, the spring is tensioned such that the bolt can be lifted from the counterpiece and the connection can be released. Thus, the locked state is an energetically stable position.

FIG. 9 illustrates reference geometries in the complex light source (thus, the first part of the light module), and the securing frame as an essential component of the second part of the light module. With the help of the reference geometries, the complex light source is positioned in the light module in statically determined manner. Such geometry is defined as an exterior shape of a solid body which allows a tight fit or a force fit. Reference geometries are, in this connection, interlocking geometries (for example, centering pins, centering holes, centering grooves, or centering ribs) with which the complex light source is positioned with clearance fits, transition fits, or slight press fits. However, simple contact surfaces can also be used on the securing frame, against which the complex light source is pressed with spring action.

In one embodiment, the spring elements for locking or play compensation are designed as metallic springs. However, elastomer springs, elastomeric pressure elements, or molded spring elements made of plastic are also conceivable. In this respect, the term "spring" means an elastic spring, if reference is not being made to a special spring (be it a metal spring, a profiled spring, or the like).

In one embodiment, at least two springs are used for backlash-free bracing of the first part and the second part of the light module. For example, a first spring 82 (or, an arrangement of several first springs 82 acting in the same direction), presses the complex light source 16 against three layers on the Y-Z plane and thus defines the following degrees of freedom: rotation around Y, rotation around Z and translation in X direction. A further spring 84 can press the complex light source 16 in Z direction against two further stops on the X-Y plane, in order to prevent the rotation around the X axis and the translation in Y and Z direction.

Depending on the selection of the contact surfaces, it may be useful to limit one of the six degrees of freedom to small values solely with a clearance fit. Rotation around the X axis and translation in Y direction are suitable here, since the requirements on positioning accuracy are usually lower. Shifting along the Y axis can thus be limited to small values by a narrow clearance fit (compare FIG. 9b).

If a spring force is supposed to press the light source 16 simultaneously against several stops, it is necessary that the spring force between the contact points acts on the light source. If a spring cannot be positioned because the relevant place is occupied by other components (or, because of other design reasons), the respective spring force can be allocated to two or more springs. In this case, the result of the spring forces must lie within the provided contact points, which are shown in FIG. 9d.

It is appropriate to use the springs 68 for the lock in FIG. 8 simultaneously as an additional spring 84 for the play compensation. In this case, there must be a pre-stress force for the additional spring 84 in locked state with which the complex light source 16 can be moved against one or more stops. This is shown in FIG. 9, where the additional spring 84 presses the snap-on hook of the bolt element 42 against an upper stop formed by the second part 18 in the form of a snap-on edge 78, wherein the additional spring 84 simultaneously also presses the first part 16 into a lower retaining geometry of the second part 18. The lower retaining geometry represents a securing frame-side part of the rotary joint 80, around which the complex light source is swiveled in the event of removal from the securing frame 20 of the second part 18. The resulting spring forces may be a multiple of the weight force of the complex light source 16, in order to ensure a backlash-free retention in the event of acceleration forces, as they may occur (for example, when driving on a bumpy road).

Overall, FIG. 9 shows an example for the positioning and backlash-free bracing of the complex light source. The spring of the lock (the additional spring 84) presses the complex light source 16 in Z direction against two stops. This results in a zero backlash in Z direction and an elimination of a circumferential backlash around the X axis. An additional spring force, which is composed of the spring forces of the first springs 82, presses the complex light source 16 roughly in X direction against three stops. This results in zero backlash in X direction, as well as an elimination of a circumferential backlash around the Y axis and the Z axis. The last degree of freedom is eliminated by a clearance fit, which only permits a little play in Y direction. In one embodiment, the stop surfaces for the Z direction mirror could be tilted symmetrically to the Z axis, such that so that equally large and opposing force components arise in Y direction. In this way, play in Y direction is also eliminated.

In one embodiment, the complex light source and the second part of the light module are braced without play, with the help of several springs. Further, the second part with securing frame may have reference geometries for the positioning of the light module in the headlight, for the secondary optical system, for the complex light source, as well as for an absorbing and/or reflecting cover. Thus the tolerances between the individual optical components can be restricted to low values.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A headlight (10) for a motor vehicle with a housing (14), at least one semiconductor light source (46) producing light for a main function of the headlight, a cooling body (48) contacting the semiconductor source in thermal coupling, a securing frame (20) mechanically connected to the housing which holds the semiconductor light source with the cooling body and the optical system in the housing, and with an interface between a first part (16) forming a complex light source, which includes the semiconductor light source and the cooling body, and a second part (18), which includes the securing frame (20), wherein the first part (16) is connected to the second part (20) at the interface so that it can be separated without destruction, and wherein the first part (16) forming the complex light source has at least one optical system (50) collecting and directing light of the semiconductor light source in addition to the semiconductor light source and the cooling body wherein the headlight (10) includes bearing structures that permit mounting of the first part (16) into the second part (18) and wherein the mounted first part (16) is pivotable about the pivot axis (29) into a locking position.

2. The headlight (10) as set forth in claim 1, wherein the headlight has a housing with a service opening (34) that is open from the factory, or that in the case of repair the housing is equipped to be cut open in a predetermined service opening region, wherein the headlight housing has geometries for the fastening of a cover (38) with which the service opening in the headlight can be sealed again after replacement of the complex light source (16).

3. The headlight (10) as set forth in claim 2, wherein the optical system of the complex light source includes all optical components of the light module (12).

4. The headlight (10) as set forth in claim 3, wherein the light module (12) is a projection module, and wherein the optical system of the complex light source includes a cover and at least one secondary optical system.

5. The headlight (10) as set forth in claim 4, wherein the secondary optical system is a projection lens or a parabolic mirror.

6. The headlight (10) as set forth in claim 1, wherein the first part (16) and the second part (18) together form a light module (12) that is a projection module.

7. The headlight (10) as set forth in claim 6, wherein the light module (12) has a cover (70) that reinforces a brightness gradient at a light/dark border of the light distribution.

8. The headlight (10) as set forth in claim 7, wherein the cover (70) is a mirror cover that directs incident light of the semiconductor light sources on its mirror surface to a secondary optical system (72) of the projection module.

9. The headlight (10) as set forth in claim 1, wherein the individual parts of the complex light source are detachably connected to one another.

10. The headlight (10) as set forth in claim 1, wherein the complex light source further includes an electronic component in which parameters of the electronic interface are stored, said parameters being able to be read out via a control device.

11. The headlight (10) as set forth in claim 1, wherein the complex light source includes a temperature sensor, in particular with an NTC or PTC resistor, with which the temperature of the light source can be determined.

12. The headlight (10) as set forth in claim 1, wherein the complex light source can be mechanically connected with detachable fastening elements, for example with screws, latches, bolt or bayonet locks to the light module, such that the complex light source can be separated from the light module without destruction and can be replaced.

13. The headlight (10) as set forth in claim 12, wherein the latches, bolt or bayonet locks have at least one spring which presses a bolt or another latching geometry into a counter-piece in which a bolt element is held non-positively and/or positively.

14. The headlight (10) as set forth in claim 13, wherein the spring and the bolt element are designed in one piece.

15. The headlight (10) as set forth in claim 13, wherein the bolt element is a part of the complex light source.

16. The headlight (10) as set forth in claim 13, wherein the bolt element is a part of the second part.

17. The headlight (10) as set forth in claim 1, further including several spring elements that brace the first part and the second part to one another without play.

* * * * *

UNITED STATES PATENT AND TRADEMARK OFFICE
CERTIFICATE OF CORRECTION

PATENT NO. : 9,476,555 B2  
APPLICATION NO. : 14/238549  
DATED : October 25, 2016  
INVENTOR(S) : Matthias Brendle, Michael Hamm and Kamislav Fadel Page 1 of 1

It is certified that error appears in the above-identified patent and that said Letters Patent is hereby corrected as shown below:

On the Title Page

Item (73) Assignee: delete "Lightning" and insert therefor --Lighting--.

Signed and Sealed this
Twenty-first Day of February, 2017

Michelle K. Lee
*Director of the United States Patent and Trademark Office*